United States Patent Office  3,313,687
Patented Apr. 11, 1967

3,313,687
APPETITE-SUPPRESSING AND WEIGHT REDUCING COMPOSITION
Harm Siemer, Warendorf, Westphalia, Germany, assignor to Andreas J. Rottendorf Chemische Fabrik, Ennigerloh, Westphalia, Germany
No Drawing. Filed Sept. 17, 1962, Ser. No. 224,603
Claims priority, application Germany, Sept. 18, 1961, R 31,127; May 16, 1962, R 32,737; May 19, 1962, R 32,756
5 Claims. (Cl. 167—55)

The present invention relates to novel therapeutically effective compounds, and a process of preparing the same.

The compounds of this invention are secondary and tertiary 1-halogen-phenyl- 2-amino-alkanones (1) which are very useful agents having appetite suppressing properties.

It is a well known fact that overweight persons are frequently suffering from hypertension. Also known is the fact that almost all the current remedies for treatment of obesity such am 1-phenyl-2-amino-propane or 2-phenyl-3-methylmorpholine or their derivatives act in a sympathomimetic way and cause an undesirable increase in blood pressure. Moreover, owing to their stimulating effect the above named drugs frequently lead to overuse and hence to addiction. This is especially true for 2-phenyl-3-methylmorpholine hydrochloride as known from the literature.

It is the object of the present invention to overcome the shortcomings of known drugs and to provide medication having appetite suppressing properties and no harmful side effects.

It has been discovered that the novel compounds according to the invention are most effective for the desired purpose without showing any of the undesirable effects of the known drugs. The compounds according to the invention are represented by the general Formula I

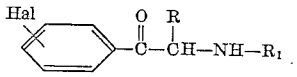

wherein R stands for a lower alkyl radical with 1–3 C-atoms, and X is a monoalkylamino or dialkylamino radical, which has alkyl groups of straight or branched chains of 1–5 C-atoms, or a cyclic amino radical with 4 or 5 C-atoms, e.g., a piperidino-, pyrrolidino or morpholino radical. These compounds have, as remarked above, excellent appetite-reducing properties without causing restlessness by over-stimulation of the sympathetic or hypertension.

In view of the just mentioned low side effects, these compounds are very useful drugs in the treatment of obesity and particularly in pre-existing hypertension. Moreover, no abuse is to be expected because of the comparatively low central stimulation, such abuse being due to the stimulating and euphoric effect of known anorexigenic agents.

The secondary 1-halogenphenyl-2-alkylaminoalkanones (1) according to the invention in which in Formula I the symbol X=NH—$R_1$, wherein $R_1$ is an alkyl radical with straight or branched chain having 1 to 5 C-atoms e.g., 1-o - chlorophenyl - 2 - ethylamino - propanone(1), 1 - o-chlorophenyl - 2 - propylamino - propanone (1) or 1 - o-bromophenyl-2-ethylamino-propanone (1) and which are represented by the general Formula II

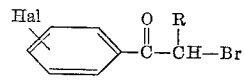

can be prepared in good yields by reacting α-Bromo-alkanones (1) of the Formula III

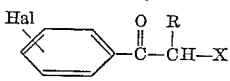

where in R has the meaning as above, with primary amines of the formula $H_2N$—$R_1$, e.g., methylamine, ethylamine, butylamine or isobutylamine, the reaction taking place at elevated temperatures. preferably in the range of 60–80° C., in the presence of a solvent, e.g., in aqueous-alcoholic solution. It is desirable to use the amine in excess. The solution resulting from the reaction is neutralized with aqueous hydrochloride acid, subsequently the alcohol is removed, and the desired compounds are obtained by conventional operations, the aqueous residue being alkalized and extracted with a hydrophobic solvent, for instance, ether. By fractional distillation, the end phase being carried out in high vacuum, the compounds according to Formula II distilled as viscous oils of yellow color. For instance, 1-p-chlorophenyl-2-ethylamino-propanone (1) distills at boiling point $_{0.03}$=114° C.

The tertiary 1-halogenphenyl-2-amino-alkanones (1) corresponding to Formula I, with X being

can be prepared under favorable economical and operational conditions, by reacting 1-halogenphenyl-2-bromalkanones (1) of Formula III with dialkylamines of the formula $HN(R_1)_2$, such as dimethylamine, diethylamine, dibutylamine, or ethyl-propylamine, the reaction to take place in the presence of a solvent, e.g., an alkanol. dioxane, or the like inert solvents known to the chemist, and by dissolving the bromoalkanones in the dialkylamine, which is preferably used in excess, by heating to temperatures between 40 and 60° C. The reaction during which the corresponding dialkylamino hydrobromides precipitate, becomes markedly exothermic toward the end and it should be adjusted, if necessary, by cooling the reaction vessel externally, in such a manner that with the use of dialkylamines of lower boiling point, e.g., diethylamine, these amines are refluxed. When higher boiling amines are used, the reaction temperature should preferably not exceed 80° C. After the reaction has slowed down, stirring may be continued for half an hour between 50 and 80° C., until the conversion is complete.

When cyclic amines are used, such as pyrrolidine or morpholine, the reaction can be carried out, as in the case of primary or secondary amines, in the presence of an inert organic solvent, although it will only be necessary to mix, while stirring, the 1-halogenphenyl-2-bromo-alkanone-(1), e.g., p-chlorophenyl-2-bromo-propanone (1) and the cyclic amine, such as pyrrolidine. The immediately evolved reaction heat is sufficient for the formation of the desired compound, for instance, 1-p-chlorophenyl - 2 - pyrrolidino-propanone (1). If necessary, in this case, too, external cooling should be applied to prevent the reaction from becoming too violent. It is preferable to control the temperature so that it will not exceed 100° C.

The above-described method, in which the amines are likewise used in excess (about 2.5 mols of amine to 1 mol bromine compound in $\alpha$-position) is particular advantageous because of its simple manipulation and its outstanding economy.

Further processing is done by first stirring the products formed in the reaction with ether; if the hydrobromides of the cyclic amines used in excess are precipitated, the ether solution is sucked off over a suction filter and the salt is washed with ether until the later is colorless. The ether solution or combined solutions are washed by shaking with saturated common salt solution and thereafter extracted with diluted hydrochloric or sulfuric acid. The aqueous, acidic solution is then alkalized and extracted with a hydrophobic solvent, e.g., ether. After renewed washing with salt solution, and drying, the solution is subjected to fractional distillation toward the end in low and high vacuum; the new compounds distilling again as viscous oils of yellow color. For instance, 1-p-chlorophenyl-2-diethylamino-propanone (1),
B.P.$_{0.05}$=117° C.
1-p-chlorophenyl-2-pyrrolidino-propanone (1),
B.P.$_{0.05}$=117° C.

The amino-hydrobromide salts of the amines which are obtained as crystals, can be converted into their bases and repeatedly used in the process of preparation.

All the compounds according to the invention have a maximum of absorption in ultraviolet light which is at about 260 m$\mu$. They can easily be converted into therapeutically useful salts by means of inorganic or organic acids according to conventional methods.

The new compounds are very useful drugs, particularly in the form of their salt addition products, such as hydrochloride, sulfate, ortho-or pyrophosphate, adipate, citrate or nicotinate. The drugs have low toxicity, advantageous blood pressure-affecting properties and show excellent appetite repression without unduly influencing central stimulation. Particularly useful are the hydrochlorides and the nicotinate hydrochlorides of the new amino compounds, for instance, hydrochloride and nicotinate of 1-p-chlorophenyl-2-ethylamino-propanone-(1) and of 1-p-chlorophenyl-2-die-ethylamino-propanone-(1).

The usual forms of administration such as dragees, tablets, suppositories and solutions for injection can be prepared by conventional methods and with the usual adjuvants, such as milk sugar, corn starch, potato starch, gelatine, stearic acid, magnesium stearate, cocoa butter, glycerine esters of saturated fatty acids, and solubilizing agents, for instance, Tween 80.

It is also possible to use the compounds according to the invention admixed with other medicines, drugs or extracts. The required dosage of the compounds lies between 10 and 250 mg. per day. More particularly dosage of 10 to 100 mg. was found to be satisfactory. As a general rule, the new compounds are administered orally, but they can also be used in the form of solutions for injections, since they are well tolerated. As a rule, the dosage for a single tablet is 25–50 mg. calculated on the free base.

In the following some pharmacological test results are listed and explained, which show that the novel 1-halogen-phenyl-2-amino-propanone (1) salts (compounds (I–IV) distinguish favorably over the known compounds V and VI.

The following compounds have been tested:
(I) 1-p-chlorophenyl-2-ethylamino-propanone (1) -HCl
(II) 1-p-chlorophenyl-2-ethylamino-propanone-(1) nicotinate hydrochloride
(III) 1-p-chlorophenyl-2-diethylamino-propanone-(1)-HCl
(IV) 1-p-chlorophenyl-2-pyrrolidino-propanone-(1) HCl
(V) d-1-phenyl-2-amino-propene-sulfate
(VI) 2-phenyl-3-methyl-morpholine-HCl TABLE 1.—(a) BLOOD PRESSURE TESTS ON CATS

| Compounds | Doses | Blood Pressure |
|---|---|---|
| I | 500 µg./kg. i.v. | 10 mm. Hg. decrease. |
| II | 500 µg./kg. i.v. | 22 mm. Hg. decrease. |
| V | 50 µg./kg. i.v. | 11 mm. Hg. increase. |
| VI | 500 µg./kg. i.v. | 30 mm. Hg. increase. |

Method: The tests were made with female cats, (whole animals, weight between 2 and 3 kgs.) in Chloralose-Urethane-Anesthesia. The drugs to be tested were injected into the femural vein in .9% NaCl solution at body temperatures.

(B) BLOOD PRESSURE TESTS ON RATS

| Compound | Doses | Bl. Pressure |
|---|---|---|
| III | 10 mg./kg. i.v. | 15 mm. Hg. Decrease. |
| IV | 10 mg./kg. i.v. | 15 mm. Hg. Decrease. |

The tests were made as described in (a).

TABLE 2.—ACUTE TOXICITY, HYPERMOTILIZING EFFECT ANOREXIGENIC EFFECT

| Compound | LD$_{50}$(s.c.) | Hypermotilizing Eff. | Anorexigenic Effect |
|---|---|---|---|
| I | 280 mg./kg. | 30 mg./kg. 237±83%. | 30 mg./kg. 90.82%. |
| II | 388 mg./kg. | 30 mg./kg. 206±27%. | 30 mg./kg. 51.3%. |
| III | 650 mg./kg. | 30 mg./kg. 256±46%. | 30 mg./kg. 98.2%. |
| IV | 410 mg./kg. | 30 mg./kg. 208±47%. | 30 mg./kg. 83.3%. |
| V | 45 mg./kg. | 3 mg./kg. 472±81%. | 10 mg./kg. 94.7%. |
| VI | 170 mg./kg. | 30 mg./kg. 320±46%. | 30 mg./kg. 78%. |

In the tests tabulated in Table II, the acute toxicity was determined on white mice (weight 20–22 grams). The spontaneous running urge was tested on female mice in circular cages, with the use of photo-electric recorders. Application of the compounds tested was subcutaneous. All figures are given in percentages of intrinsic hypermotility of untreated mice. The anorexigenic effect was determined in single feeding tests after oral application of the compounds to be tested. The tested animals were female Wistar rats.

In the following the preparation of the noval drugs will be more fully described in a number of examples but it should be understood that these are given by way of illustration and not of limitation and that many changes in the details can be used without departing from the spirit of the invention.

*Example 1*

31 grams 1-chloropheny-2-bromo-propanone-(1) were dissolved in 100 mls. ethanol; added thereto were 20 grams of a 50% aqueous ethylamine solution at 50° C. and the mixture was then stirred for 1 hour at 60° C. Thereafter, the solution resulting from the reaction is neutralized in the cold with 35% hydrochloric acid to a pH 7, and is then distilled for removal of alcohol under reduced pressure. 50 mls. of water are then added to the remaining crystal sludge which is alkalized with 35% NaOH. Then, the mass is three times extracted with 100 mls. ether at a time, the ether phase is washed with water and common salt solution, and finally dried over sodium sulfate. The ether solution is then evaporated and the residue is distilled in a high vacuum. Obtained is 1-p-chlorophenyl-2-ethylamino-propanone (1) at B.P.$_{0.30}$ =107–114° C., at a yield of 86.8 percent of the theoretical value.

The 1-p-chlorophenyl-2-ethylamino-propanone (1) hydrochloride obtained by use of acetone, methanolic HCl, and ether, melts at 228° C. (with decomposition).

Example 2

30 grams of 1-p-chlorophenyl-2-bromo-propanone (1) were mixed with 22 grams diethylamine and dissolved by heating with stirring on a water bath of about 40° C. The reaction temperature then evolving is adjusted by occasional external cooling in such a manner that the reflux will be moderate. After the reaction has slowed down, stirring is continued for half an hour at about 60° C., then the mass is allowed to cool and 100 mls. ether are added thereto. The precipitated diethylamino-hydrobromide is sucked off and washed with 50 mls. ether. The combined ether phases are subjected to shaking twice with 15 mls. salt solution at a time and subsequently extracted with 5% hydrochloric acid. The extract is alkalized and again extracted with 150 mls. ether. The extract is washed once again with a small amount of salt solution and dried.

Fractional distillation performed in the final stage in an oil pump vacuum, yields 1-p-chlorophenyl-2-diethylamino-propanone (1) at $B.P._{0.1}=112-113°$ C. in the form of a viscous yellow oil, at an output of 84.2% of the theoretical value.

The 1-p-chlorophenyl-2-diethylamino-propanone (1) hydrochloride made with acetic ester, methanol and methanolic HCl has a melting point of 109° C.

Example 3

30 grams 1-p-chlorophenyl-2-bromo-propanone (1) are mixed with 22 grams pyrrolidine while stirring. The evolved reaction heat is allowed to taper off while stirring and stirring is continued until the reaction mass has cooled down. Subsequently, 250 mls. ether are added and the ether phase is worked up as described in Example 2.

The 1-p-chlorophenyl-2-pyrrolidino-propanone (1) distills at a $B.P._{0.05}=117-119°$ C. The yield is 87.3% of the theoretical value. The 1-p-chlorophenyl-2-pyrrolidino-propanone (1) hydrochloride made in accordance with Example 2, has a melting point of 212° C. (with decomposition). The nicotinate hydrochloride was likewise prepared and had the melting point.

In a similar manner, I prepared from 1-p-chlorophenyl-2-bromo-propanone (1) by reaction with piperidine the 1-chlorophenyl-2-piperidino-propanone (1) with a boiling point 128° at 0.05 atm., and therefrom by reaction with acetic ester methanol and methanolic HCl the corresponding hydrochloride which decomposes while melting at 214° C.

Also prepared was the 1-chlorophenyl-2-morpholino-propanone (1) of boiling point 135° C., at 0.03 atm., its hydrochloride melting point 212° C.

Example 4

In the manner described in Example 1, 31 grams 1-o-chlorophenyl-2-bromo-propanone (1) are dissolved in alcohol and reacted with 20 grams of 50% aqueous ethylamine solution and the reaction mixture is worked up as described.

The resulting 1-o-chlorophenyl-2-ethylamino-propanone (1) distills at $B.P._{0.1}=126-128°$ C. with a yield of 82.5% of the theoretical value.

Example 5

In accordance with the method described in Examples 1 and 4, 45 grams of 1-o-bromophenyl-2-bromo-propanone(1) were reacted with 23 grams of a 50% aqueous ethylamine solution, and worked up subsequently. The product obtained was 1-o-bromophenyl-ethylamino-propanone(1) which distilled at $B.P._{0.05}=123-125°$ C. with a yield of 78.2% of the theoretical value.

Example 6

In accordance with the method described in Example 2, 23.1 grams of 1-p-chlorophenyl-2-bromo-butanone(1) and 16 grams diethylamine are reacted and worked up.

The boiling point of the 1-p-chlorophenyl-2-diethylamino-butanone(1) is 121–123° C. at the pressure of 0.01 atm.; the yield is 83.2% of the theoretical value.

Example 7

16 grams of nicotinic acid-HCl are dissolved in 100 mls. methanol and to this is added a solution of 21 grams 1-p-chlorophenyl-2-ethylamino-propanone(1) in 20 mls. methanol. Subsequently, the mass is stirred for 1 hour at 40° C., 200 mls. ether are added, and the mixture is allowed to stand overnight on ice and sucked off. The residue is washed with ether and dried.

Melting point of the 1-p-chlorophenyl-2-ethylamino-propanone(1) nicotinate hydrochloride is 187° C., the product melting with decomposition. The yield was 93.5% of the theoretical value.

Example 8

10,000 tablets were made as follows:

| | G. |
|---|---|
| (I) 1-p-chlorophenyl-2-ethylamino-propanone(1)-HCl | 300 |
| Milk sugar | 400 |
| Potato starch | 700 |
| (II) Starch solution 10% | 500 |
| (III) Talcum | 30 |
| Stearic acid | 20 |
| Potato starch | 300 |

I and II are granulated and dried, and thereafter mixed with III and compressed into tablets. The 10,000 tablets weigh 1.80 kg., the diameter of each tablet is 8 mm.; 1 tablet contains 30 mgs. effective drug.

Example 9

10,000 dragees were made as follows:

Of the substance obtained according to Example 5, 25 mgs. were used as a core for each dragee; each core was then covered with 100 mls. Eudragit L and thereafter coated in a conventional manner with sugar, talcum, calcium carbonate, gum arabic and sugar solution to a final weight of 350 milligrams per dragee. The dragees are then covered with Eudragit E. The dragee coating contains per dragee:

| | G. |
|---|---|
| Sugar | 0.1275 |
| Talcum | 0.0170 |
| Calcium carbonate | 0.0170 |
| Gum arabic | 0.0085 |
| Eudragit L | 0.0012 |
| Eudragit E | 0.0001 |

For making the final dragees the sugar solution is colored with 0.0004 gram per dragee of one of the following dyestuffs: Orange I, Red I, Yellow 3.

Example 10

In the manner described in Example 1, 31 grams 1-p-chlorophenyl-2-bromo-propanone(1) are dissolved in alcohol and reacted in a pressure apparatus with 15 grams of 50% aqueous dimethylamine solution and the reaction mixture is worked up as described.

The resulting 1-p-chlorophenyl-2-dimethylamino-propanon(1) distills at $B.P._{0.1}=104-106°$ C. with a yield of 63% of the theoretical value.

The 1-p-chlorophenyl-2-dimethylamino-propanon(1) hydrochloride has a melting point of 106° C.

What is claimed is:

1. An appetite-suppressing and weight reducing composition containing 10–100 milligrams of a compound selected from the group consisting of 1-p-chlorophenyl-2-ethylamino-propanone(1) the hydrochloride thereof, and the nicotinate hydrochloride thereof together with a pharmaceutical adjuvant.

2. An appetite-suppressing and weight reducing composition containing 10–100 milligrams of a compound selected from the group consisting of 1-p-chlorophenyl-2-diethylamino-propanone(1) the dydrochloride thereof, and the nicotinate hydrochloride thereof together with a pharmaceutical adjuvant.

3. An appetite-suppressing and weight reducing composition containing 10–100 milligrams of a compound selected from the group consisting of 1-p-chlorophenyl-2-methylaminopropanone(1) the hydrochloride thereof, and the nicotinate hydrochloride thereof together with a pharmaceutical adjuvant.

4. An appetite-suppressing and weight reducing composition containing 10–100 milligrams of a compound selected from the group consisting of 1-p-chlorophenyl-2-dimethylaminopropanone(1) the hydrochloride thereof and the nicotinate hydrochloride thereof together with a pharmaceutical adjuvant.

5. An appetite-suppressing and weight reducing composition containing 10–100 milligrams of a compound selected from the group consisting of 1-p-chlorophenyl-2-ethylamino-propanone(1) and therapeutically useful acid addition salts thereof, together with a pharmaceutical adjuvant.

References Cited by the Examiner
UNITED STATES PATENTS

| | | | |
|---|---|---|---|
| 2,714,083 | 7/1955 | Ferguson | 167—55 |
| 2,904,591 | 9/1959 | Hanell | 260—570.5 |
| 3,001,910 | 9/1961 | Schutte | 167—55 |
| 3,082,255 | 3/1963 | Stevens | 260—570.5 |

OTHER REFERENCES

Dainippon-Japanese Patent 13,215, 1961 (Abstracted in Chem. Abst., vol. 56, 1962, p. 8633C).

SAM ROSEN, *Primary Examiner.*

FRANK CACCIAPAGLIA, JR., LEWIS GOTTS, JULIAN S. LEVITT, *Examiners.*